(12) United States Patent
Feng (10) Patent No.: US 11,262,081 B2
(45) Date of Patent: *Mar. 1, 2022

(54) ROASTER STRUCTURE WITH COVER SUPPORTING MEMBER FOR ACHIEVING SECURE ANGULAR POSITIONS

(71) Applicant: Fu-Du Feng, Taipei (TW)

(72) Inventor: Fu-Du Feng, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,101

(22) Filed: Oct. 26, 2020

(65) Prior Publication Data

US 2021/0278091 A1 Sep. 9, 2021

Related U.S. Application Data

(63) Continuation-in-part of application No. 16/811,825, filed on Mar. 6, 2020, now Pat. No. 11,147,417.

(30) Foreign Application Priority Data

Aug. 19, 2020 (CN) .......................... 202021739794.0

(51) Int. Cl.
*F24C 15/02* (2006.01)
*A47J 36/12* (2006.01)
*A47J 37/07* (2006.01)
*F24B 1/02* (2006.01)

(52) U.S. Cl.
CPC ............. *F24C 15/023* (2013.01); *A47J 36/12* (2013.01); *A47J 37/0786* (2013.01); *F24C 15/026* (2013.01); *F24B 1/02* (2013.01)

(58) Field of Classification Search
CPC .... A47J 37/07; A47J 37/0786; A47J 37/0704; F24C 15/02; F24C 15/023
See application file for complete search history.

(56) References Cited

U.S. PATENT DOCUMENTS 6,581,587 B1 * 6/2003 Helms .................... A47J 36/12
110/178
9,818,566 B2 * 11/2017 Aubry ..................... H01H 3/38

* cited by examiner

*Primary Examiner* — Edelmira Bosques
*Assistant Examiner* — Nikhil P Mashruwala
(74) *Attorney, Agent, or Firm* — Juan Carlos A. Marquez; Marquez IP Law Office, PLLC (57) ABSTRACT

A roaster structure with a cover supporting member for achieving secure angular positions includes a roaster body and a ceramic cover in addition to the cover supporting member for achieving secure angular positions. The cover supporting member for achieving secure angular positions includes: a lower supporting member fixedly provided on one side of the roaster body and having a first joining end and at least one limiting groove; an upper supporting member pivotally joined to the lower supporting member and having a second joining end; at least one position-limiting member fixed on the upper supporting member and slidably inserted into the at least one limiting groove; and an extensible and retractable bar joined between the two joining ends. The ceramic cover can be lifted open and closed with respect to the roaster body and secured at any angular position via the cover supporting member for achieving secure angular positions.

3 Claims, 7 Drawing Sheets

ROASTER STRUCTURE WITH COVER SUPPORTING MEMBER FOR ACHIEVING SECURE ANGULAR POSITIONS

BACKGROUND OF THE INVENTION

1. Technical Field

The present invention relates to a roaster structure with a cover supporting member for achieving secure angular positions. More particularly, the invention relates to a roaster structure that can be applied to a ceramic roaster for roasting food and that has a cover supporting member for securing the cover of the roaster at different angles.

2. Description of Related Art

Food roasting, or barbecue, has become a form of multipersonal recreation or entertainment and can now be carried out in many different ways thanks to the development of various roasters, roasting racks, sauces for roasts, and so on. It is not uncommon that members of an entire family or several families are invited to participate in an outdoor barbecue on a holiday or other festive occasion, and in order to produce palatable roasted food, ceramic roasters may be the best choice when it comes to the roasting device to be used.

Figure 1:
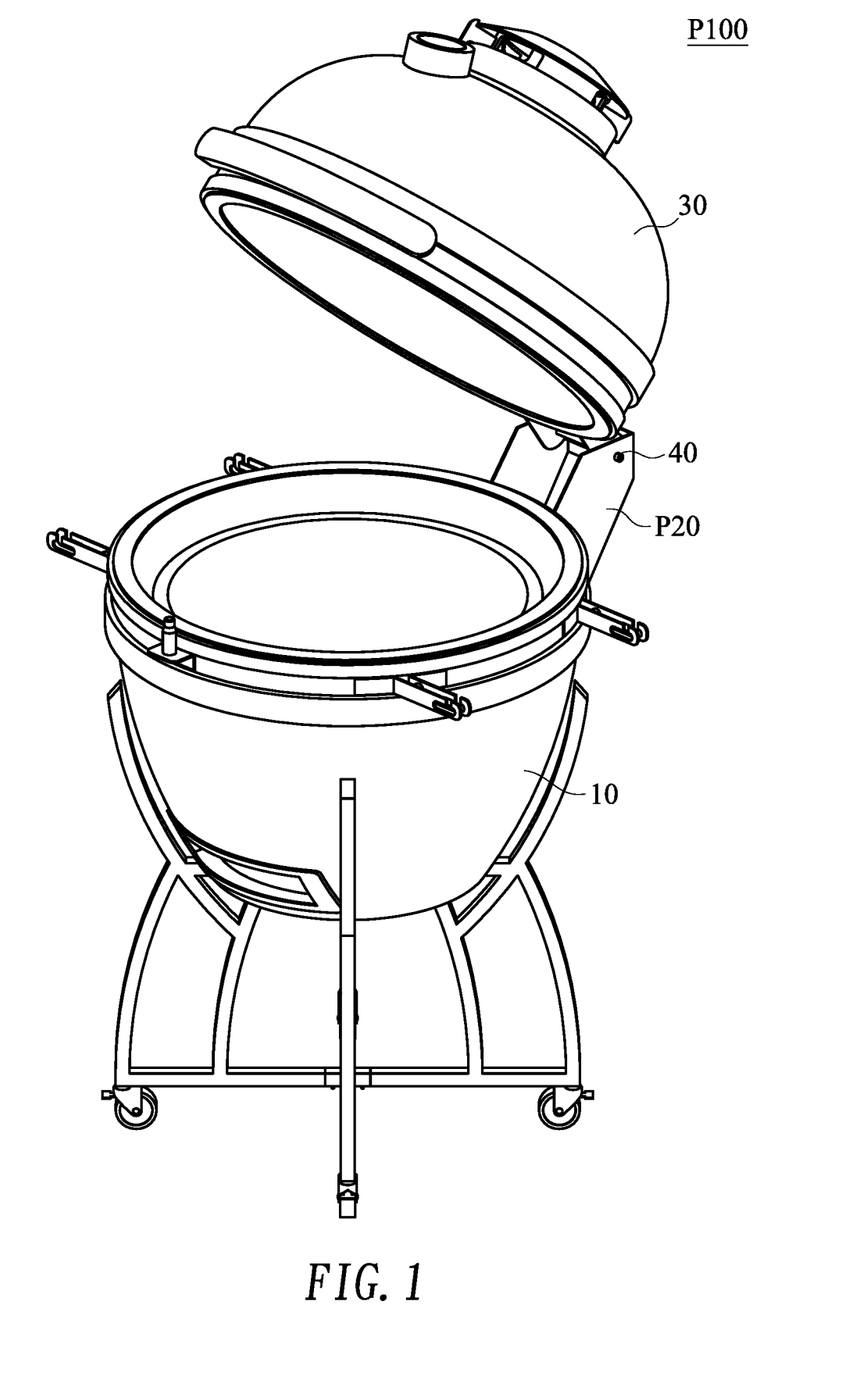
FIG. 1 is a perspective view of a conventional ceramic roaster.

Referring to FIG. 1, a ceramic roaster can enhance the flavor of the food roasted therein but is extremely heavy due to the fact it is made by firing shaped pottery clay in a kiln: the ceramic cover 30 alone may weigh 30~50 kg. During the roasting process, therefore, not only does it require a great physical effort to lift open the ceramic cover of a ceramic roaster, but also improper operation of the ceramic cover can be dangerous.

The roaster body 10 and the ceramic cover 30 of the conventional ceramic roaster P100 are joined by a supporting member P20 that incorporates a pivot shaft 40. This kind of structure, however, tends to be physically demanding during use, and in most case, the ceramic cover 30 can be opened and closed only by a male user. Moreover, as the ceramic cover 30 is not designed to be secured at any of a plurality of preset positions, one who is lifting open the ceramic cover 30 cannot secure the ceramic cover 30 at an initial position to form a small gap that allows the hot air in the conventional ceramic roaster P100 to escape first. The person, therefore, may be burned by the hot air rushing out of the conventional ceramic roaster P100 when the ceramic cover 30 is opened in one go.

BRIEF SUMMARY OF THE INVENTION

The present invention provides a roaster structure that has a cover supporting member for achieving secure angular positions. The roaster structure aims to solve the prior art problem that the weight of the ceramic cover of a conventional ceramic roaster has prevented the ceramic cover from being successfully, persistently, or relatively effortlessly secured at an arbitrary angular position while being opened or closed, especially in cold weather.

The present invention provides a roaster structure that has a cover supporting member for achieving secure angular positions. The roaster structure includes a roaster body and a ceramic cover in addition to the cover supporting member for achieving secure angular positions. The roaster body is a bowl-shaped structure and has a hollow portion. The sidewall of the roaster body has a bottom-side opening. The cover supporting member for achieving secure angular positions includes: a lower supporting member fixedly provided on one side of the roaster body and having a first joining end and at least one limiting groove; an upper supporting member joined to the lower supporting member by a pivot shaft and having a second joining end; at least one position-limiting member fixed on the upper supporting member and slidably inserted into the at least one limiting groove; and an extensible and retractable bar having a first joining portion and a second joining portion, wherein the first joining portion is movably joined to the first joining end, and the second joining portion is movably joined to the second joining end. The ceramic cover is joined to the upper supporting member at one end and can therefore be lifted open and closed with respect to the roaster body and secured at multiple positions via the cover supporting member for achieving secure angular positions.

Implementation of the present invention can produce at least the following advantageous effects:

1. The heavy ceramic cover can be opened and closed in a relatively effortless manner.
2. The ceramic cover can be successfully or relatively effortlessly opened and closed in cold weather.
3. The ceramic cover can be persistently supported at a particular angle in the opened state.
4. One who is lifting open the ceramic cover can protect themselves from being burned by the hot air in the roaster.
5. The ceramic cover can be secured at any angle.

BRIEF DESCRIPTION OF THE SEVERAL VIEWS OF THE DRAWINGS

A detailed description of features and advantages of the present invention will be given below, so that a person skilled in the art is allowed to understand and carry out the technical content of the present invention, and can readily comprehend the above-mentioned and other objectives and advantages of the present invention after reading the content disclosed herein and the claims in conjunction with the appended drawings, wherein:

DETAILED DESCRIPTION OF THE INVENTION

Figure 2A:
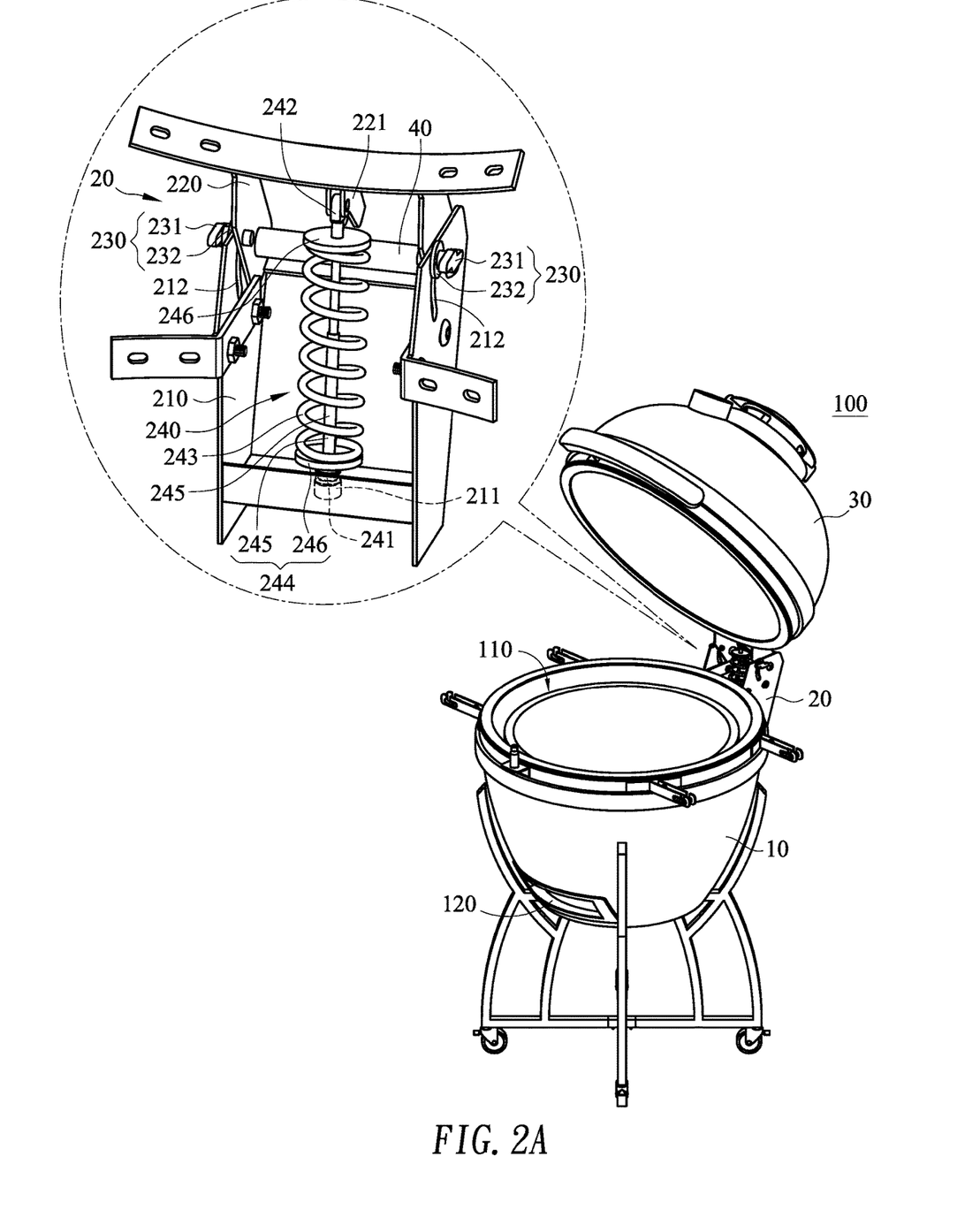
FIG. 2A is a perspective view of a roaster structure with a cover supporting member for achieving secure angular positions.
Figure 2B:
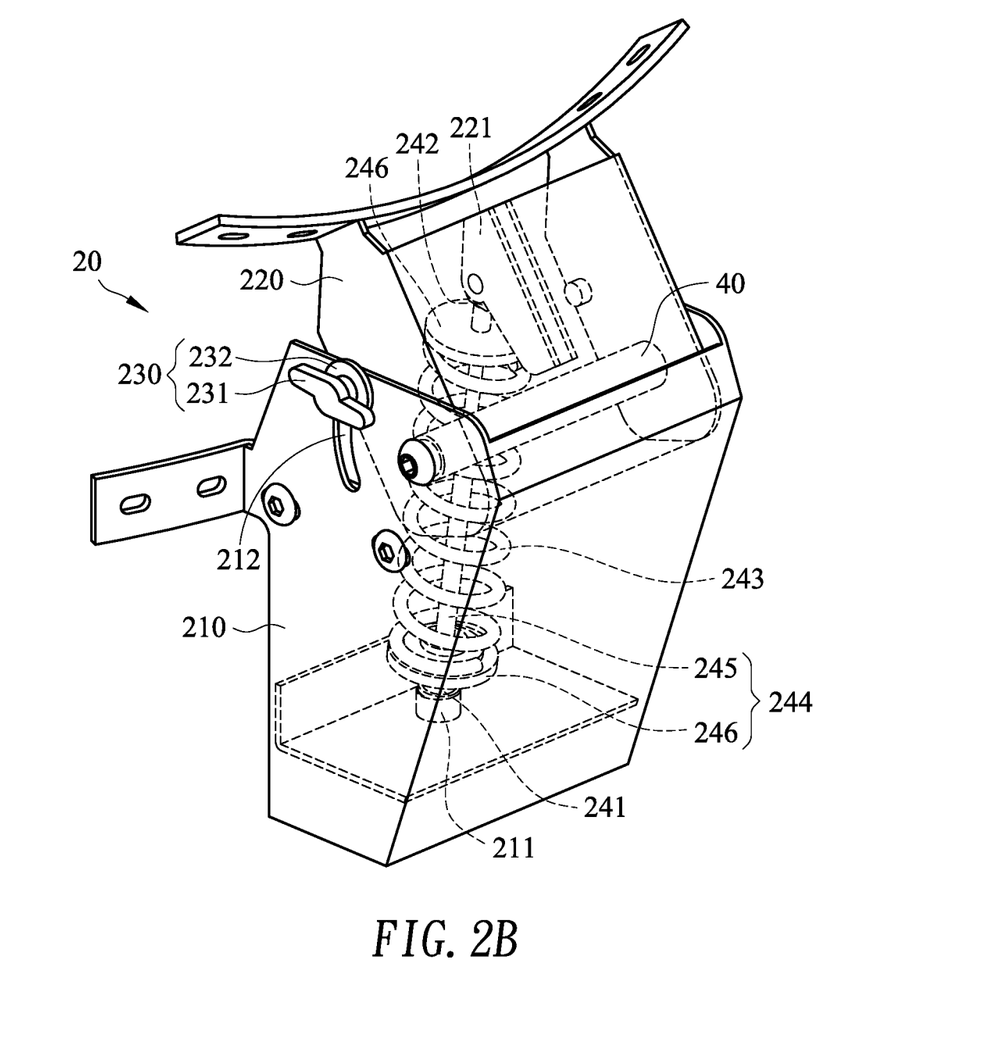
FIG. 2B is a perspective view of the cover supporting member for achieving secure angular positions in FIG. 2A.

Referring to FIG. 2A and FIG. 2B, the present invention provides a roaster structure 100 that has a cover supporting member for achieving secure angular positions. The roaster structure 100 includes a roaster body 10, a cover supporting member 20 for achieving secure angular positions, and a ceramic cover 30. The roaster body 10 and the ceramic cover 30 are made by firing shaped pottery clay in a kiln and feature heavy weight, great thicknesses, and good thermal insulation.

The roaster body 10 is a bowl-shaped structure and has a hollow portion 110. The sidewall of the roaster body 10 has a bottom-side opening 120.

The cover supporting member 20 for achieving secure angular positions includes a lower supporting member 210, an upper supporting member 220, at least one position-limiting member 230, and an extensible and retractable bar 240. The cover supporting member 20 for achieving secure angular positions is a structure that provides mechanical advantage to facilitate lifting open and closing the ceramic cover 30.

The lower supporting member 210 may be a metal member. The lower supporting member 210 is fixedly provided on one side of the roaster body 10. The lower supporting member 210 has a first joining end 211 to which the extensible and retractable bar 240 is joined and at least one limiting groove 212 for controlling the largest angle to which the ceramic cover 30 can be lifted open.

The upper supporting member 220 may also be a metal member. The upper supporting member 220 is fixedly provided on one side of the ceramic cover 30. The upper supporting member 220 is joined to the lower supporting member 210 via a pivot shaft 40. The upper supporting member 220 has a second joining end 221 to which the extensible and retractable bar 240 is joined.

The at least one position-limiting member 230 may be, for example, two rods that are fixed on two opposite sides of the upper supporting member 220 respectively, and these two position-limiting members 230 are slidably inserted into the two limiting grooves 212 of the lower supporting member 210 respectively such that the largest angle to which the ceramic cover 30 can be lifted open is controlled by the position-limiting members 230 and the length of the limiting grooves 212.

More specifically, the at least one position-limiting member 230 may be implemented as two locking bolts 231, with a pressing and securing plate 232 joined to each locking bolt 231, and with the two locking bolts 231 respectively fixed on two opposite sides of the upper supporting member 220 and respectively inserted into the two limiting grooves 212 of the lower supporting member 210 in a slidable manner. In that case, the ceramic cover 30 can be secured at an arbitrary angle by turning the locking bolts 231 until the pressing and securing plates 232 are respectively pushed by the locking bolts 231 and are pressed tightly against the lower supporting member 210 to secure the ceramic cover 30 at the arbitrary angle.

Figure 3:
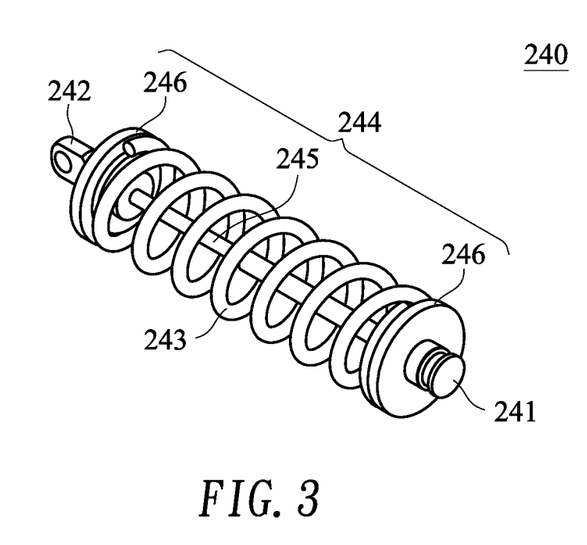
FIG. 3 is a perspective view of an extensible and retractable bar.

Referring to FIG. 3, the extensible and retractable bar 240 has a first joining portion 241 to be movably joined to the first joining end 211 of the lower supporting member 210. The extensible and retractable bar 240 also has a second joining portion 242 to be movably joined to the second joining end 221 of the upper supporting member 220.

More specifically, the extensible and retractable bar 240 may include a spring 243 and a spring holder 244.

The spring holder 244 includes an extensible and retractable supporting rod 245 and a pair of clamping plates 246 provided respectively at the two ends of the extensible and retractable supporting rod 245. The spring 243 is mounted around the extensible and retractable supporting rod 245 and is located between the two clamping plates 246. The first joining portion 241 of the extensible and retractable supporting rod 245 is joined to the first joining end 211, and the second joining portion 242 of the extensible and retractable supporting rod 245 is movably joined to the second joining end 221. Thus, the extensible and retractable bar 240 allows the ceramic cover 30 to be lifted open and closed in a relatively effortless manner.

Figure 4A:
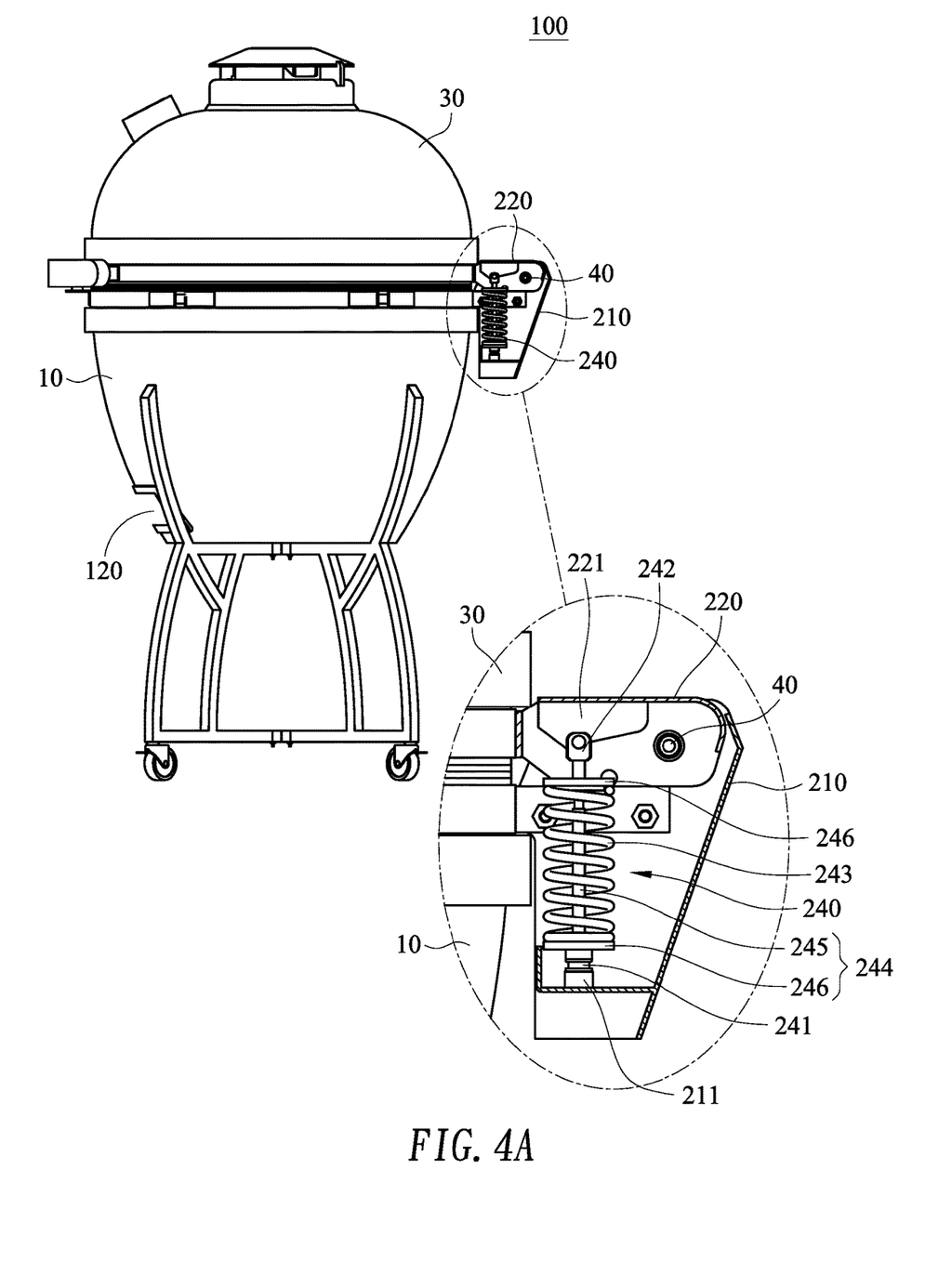
FIG. 4A shows a side view of the roaster structure in FIG. 2A and a sectional view of the cover supporting member for achieving secure angular positions, with the ceramic cover tightly closed.
Figure 4B:
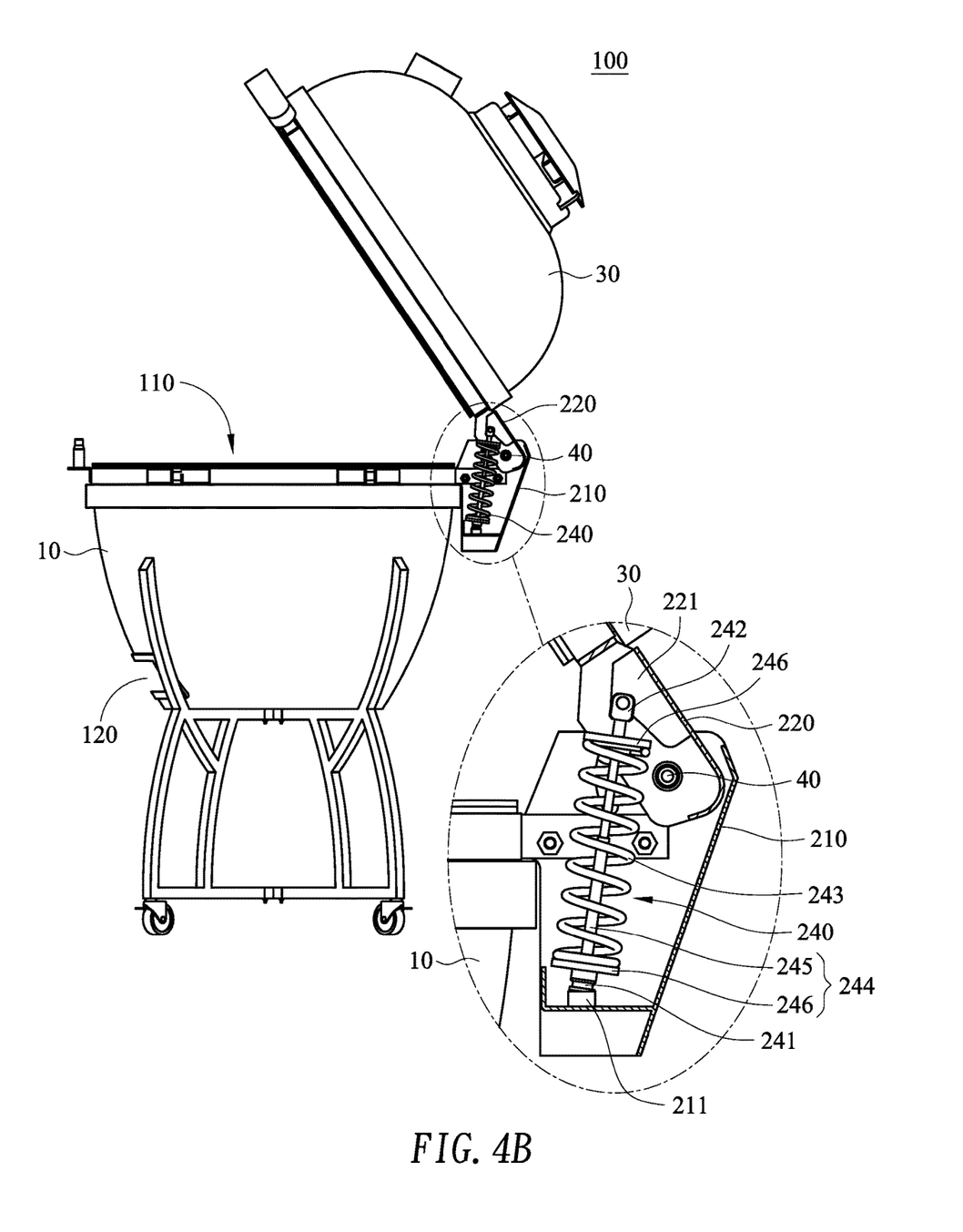
FIG. 4B shows another side view of the roaster structure in FIG. 2A and another sectional view of the cover supporting member for achieving secure angular positions, with the ceramic cover lifted open.
Figure 5:
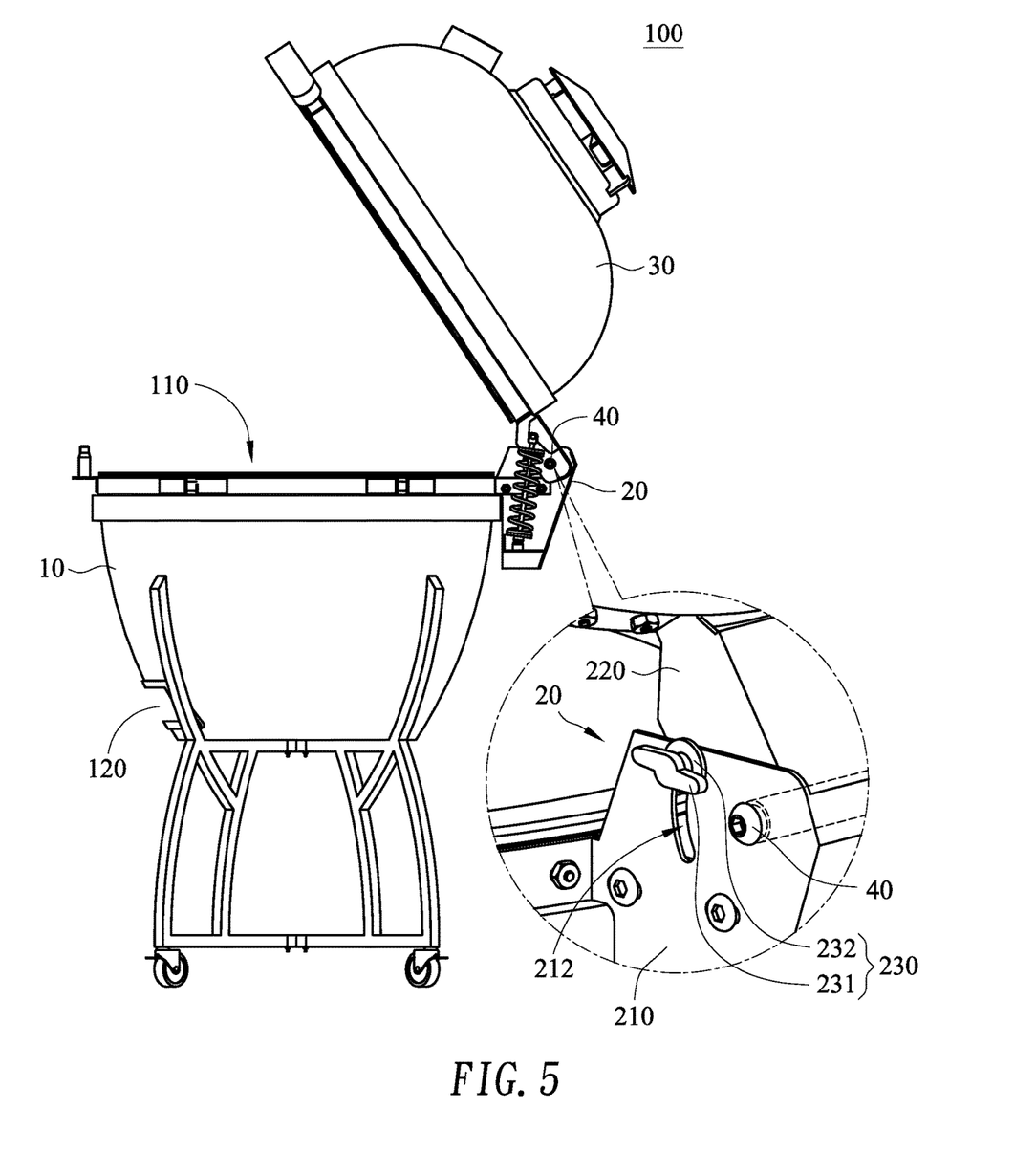
FIG. 5 shows the same side view as in FIG. 4B and a partial enlarged view of the cover supporting member for achieving secure angular positions, with the ceramic cover lifted open.

Referring to FIG. 4A, FIG. 4B, and FIG. 5, the cover supporting member 20 for achieving secure angular positions joins the ceramic cover 30 and the roaster body 10 together to form the complete roaster structure 100. The ceramic cover 30 is joined to the upper supporting member 220 at one end and can therefore be lifted open and closed with respect to the roaster body 10 in a relatively effortless manner via the cover supporting member 20 for achieving secure angular positions.

The present invention has been described with preferred embodiments thereof. It is understood that the embodiments are intended to allow a person skilled in the art to understand and carry out the content of the present invention, and not intended to limit the scope of the present invention. Therefore, all equivalent changes or modifications which do not depart from the spirit of the present invention should be encompassed by the appended claims.

What is claimed is:

1. A roaster structure with a cover supporting member for achieving secure angular positions, comprising:
    a roaster body formed as a bowl-shaped structure and having a hollow portion, the roaster body having a sidewall with a bottom-side opening;
    the cover supporting member for achieving secure angular positions, which comprises:
        a lower supporting member fixedly provided on a side of the roaster body and having a first joining end and at least one limiting groove;
        an upper supporting member joined to the lower supporting member via a pivot shaft and having a second joining end;
        at least one position-limiting member fixed on the upper supporting member and slidably inserted into the at least one limiting groove; and
        an extensible and retractable bar having a first joining portion movably joined to the first joining end, the extensible and retractable bar having a second joining portion movably joined to the second joining end; and
    a ceramic cover having an end joined to the upper supporting member such that the ceramic cover is able to be lifted open and closed with respect to the roaster body and secured at a plurality of positions via the cover supporting member for achieving secure angular positions.

2. The roaster structure of claim 1, wherein the at least one position-limiting member comprises a locking bolt and a pressing and securing plate joined to the locking bolt, and the locking bolt is able to be turned so as to press the pressing and securing plate tightly against the lower supporting member and thereby secure the ceramic cover at an arbitrary angle.

3. The roaster structure of claim 1, wherein the extensible and retractable bar comprises:
    a spring; and
    a spring holder comprising an extensible and retractable supporting rod and a pair of clamping plates provided respectively at two opposite ends of the extensible and retractable supporting rod, wherein the spring is mounted around the extensible and retractable supporting rod and is located between the pair of clamping plates, and the extensible and retractable supporting rod has the first joining portion, which is joined to the first joining end, and the second joining portion, which is movably joined to the second joining end.

\* \* \* \* \*